(12) United States Patent
Logan et al.

(10) Patent No.: US 10,502,141 B2
(45) Date of Patent: Dec. 10, 2019

(54) APPARATUS AND METHOD FOR CONTROLLING A PRESSURE DIFFERENTIAL ACROSS A SEAL OF A BEARING CHAMBER

(71) Applicant: PRATT & WHITNEY CANADA CORP., Longueuil (CA)

(72) Inventors: Adam Logan, Toronto (CA); Ritchie Domingo, Markham (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 272 days.

(21) Appl. No.: 15/446,521

(22) Filed: Mar. 1, 2017

(65) Prior Publication Data
US 2018/0252163 A1   Sep. 6, 2018

(51) Int. Cl.
| | |
|---|---|
| F02C 7/28 | (2006.01) |
| F02C 7/06 | (2006.01) |
| F02C 7/32 | (2006.01) |
| F16C 33/74 | (2006.01) |
| F01D 25/16 | (2006.01) |
| F01D 25/18 | (2006.01) |
| F16C 33/66 | (2006.01) |
| F16C 33/78 | (2006.01) |

(52) U.S. Cl.
CPC ............... *F02C 7/28* (2013.01); *F01D 25/16* (2013.01); *F01D 25/183* (2013.01); *F02C 7/06* (2013.01); *F02C 7/32* (2013.01); *F16C 33/748* (2013.01); *F05D 2220/32* (2013.01); *F05D 2260/605* (2013.01); *F05D 2270/3015* (2013.01); *F16C 33/6685* (2013.01); *F16C 33/7816* (2013.01); *F16C 2360/23* (2013.01)

(58) Field of Classification Search
CPC ...... F02C 7/28; F02C 7/06; F02C 7/32; F02C 9/16; F01D 25/16; F01D 25/183; F16C 33/748
See application file for complete search history.

(56) References Cited

U.S. PATENT DOCUMENTS

| | | | |
|---|---|---|---|
| 4,497,172 A | 2/1985 | Smith | |
| 8,235,647 B2 * | 8/2012 | Pisseloup | F01D 25/16 184/6.11 |
| 9,097,138 B2 | 8/2015 | Glahn et al. | |
| 9,316,118 B2 | 4/2016 | Alvarez et al. | |
| 2009/0078506 A1 * | 3/2009 | Franconi | B64D 13/02 184/5.1 |
| 2012/0315137 A1 * | 12/2012 | Alvarez | F01D 25/18 415/229 |
| 2013/0177406 A1 * | 7/2013 | Heaton | F01D 25/162 415/176 |

(Continued)

*Primary Examiner* — Syed O Hasan
(74) *Attorney, Agent, or Firm* — Norton Rose Fulbright Canada LLP

(57) ABSTRACT

Apparatus and methods for controlling a pressure differential across one or more seals of a bearing chamber in a gas turbine engine are disclosed. In some embodiments, the apparatus comprises a scavenge pump in fluid communication with an interior of the bearing chamber for driving oil from the bearing chamber; and a venting valve. The venting valve is configured to cause venting of the interior of the bearing chamber in parallel to the scavenge pump based on the pressure differential across the one or more seals.

9 Claims, 6 Drawing Sheets

(56) References Cited

U.S. PATENT DOCUMENTS

2014/0096533 A1* 4/2014 Homeyer .............. F01D 25/183
                                                                  60/778
2016/0010499 A1* 1/2016 Gatto ..................... F02C 7/06
                                                                  184/6.11

\* cited by examiner

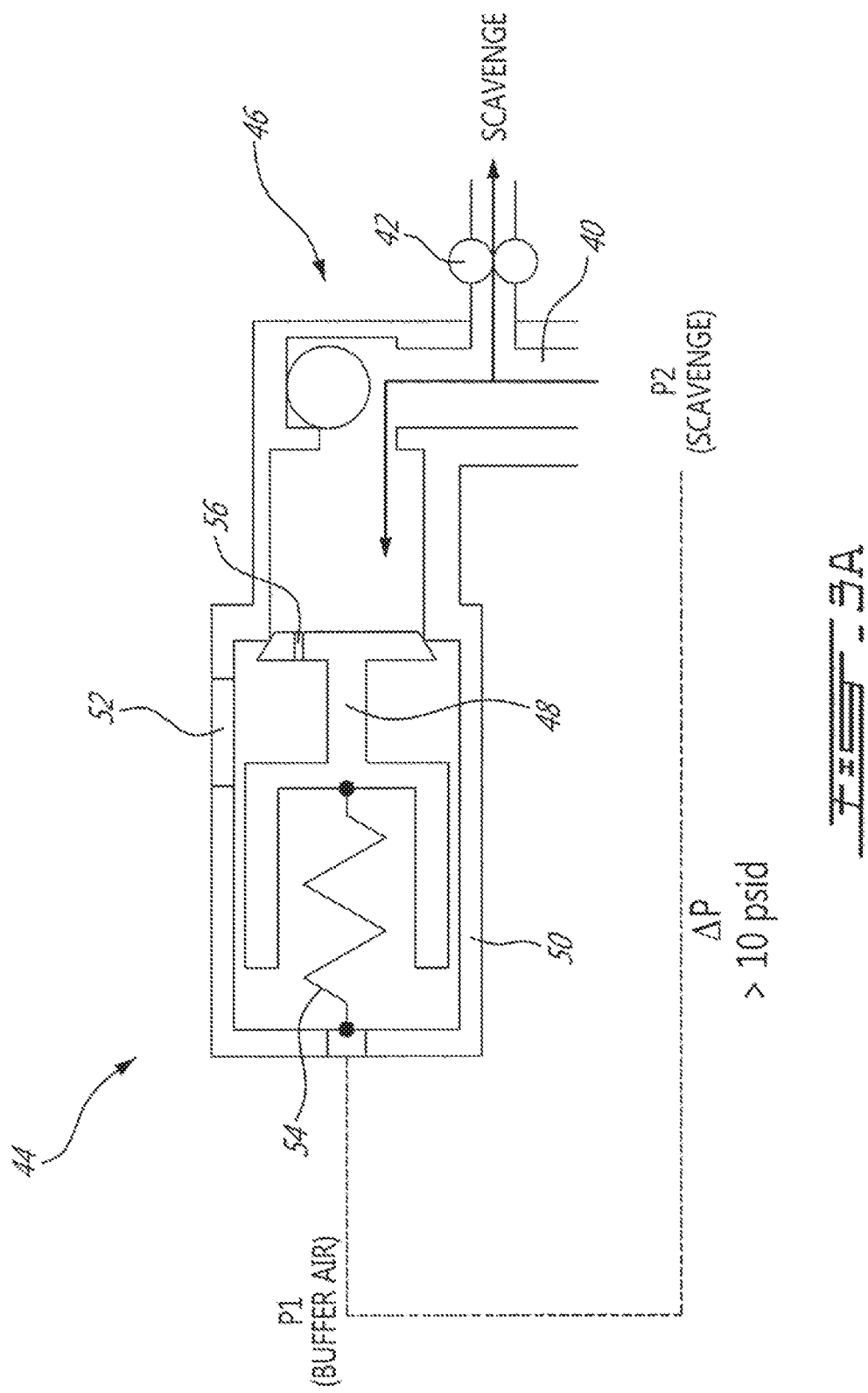

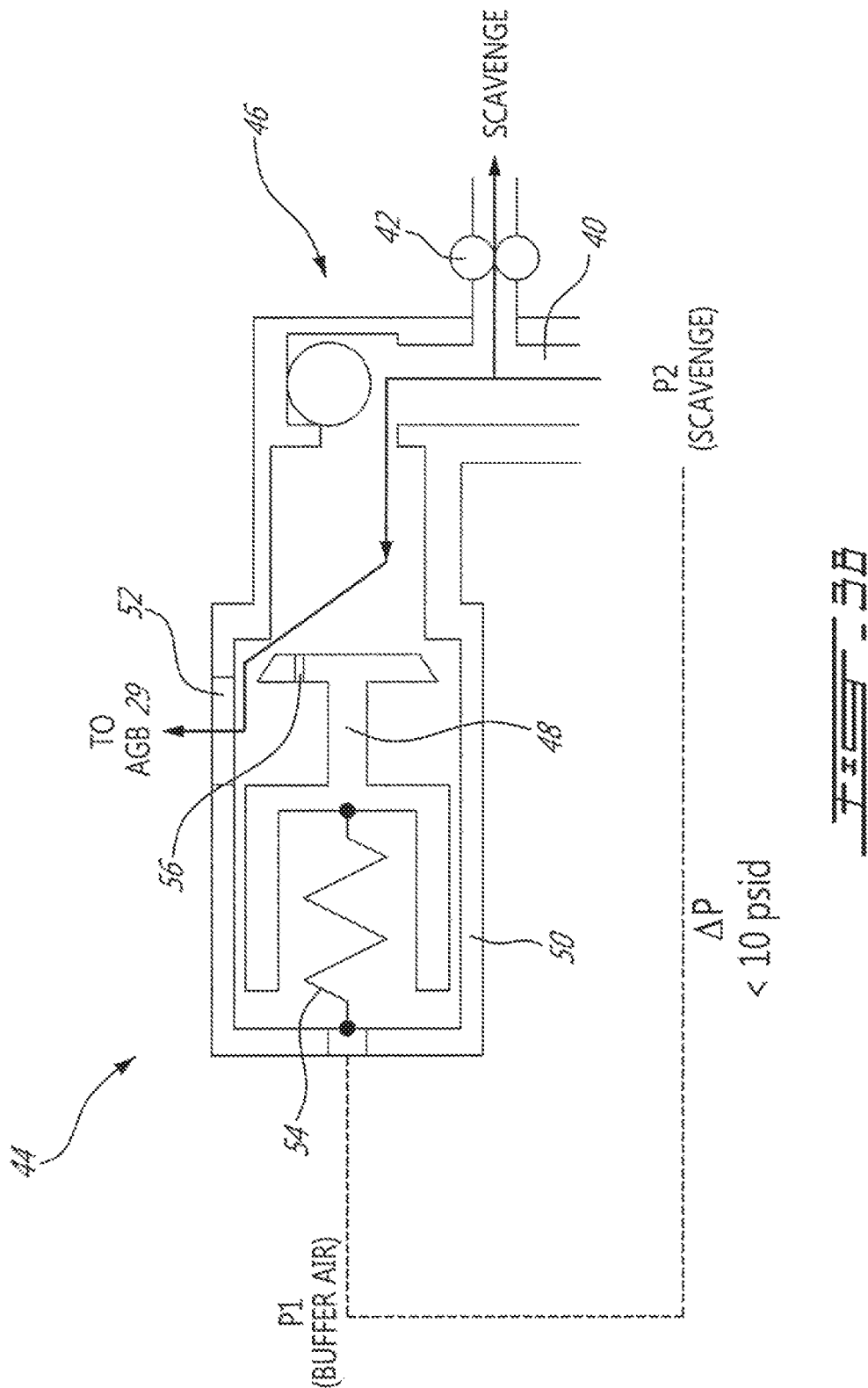

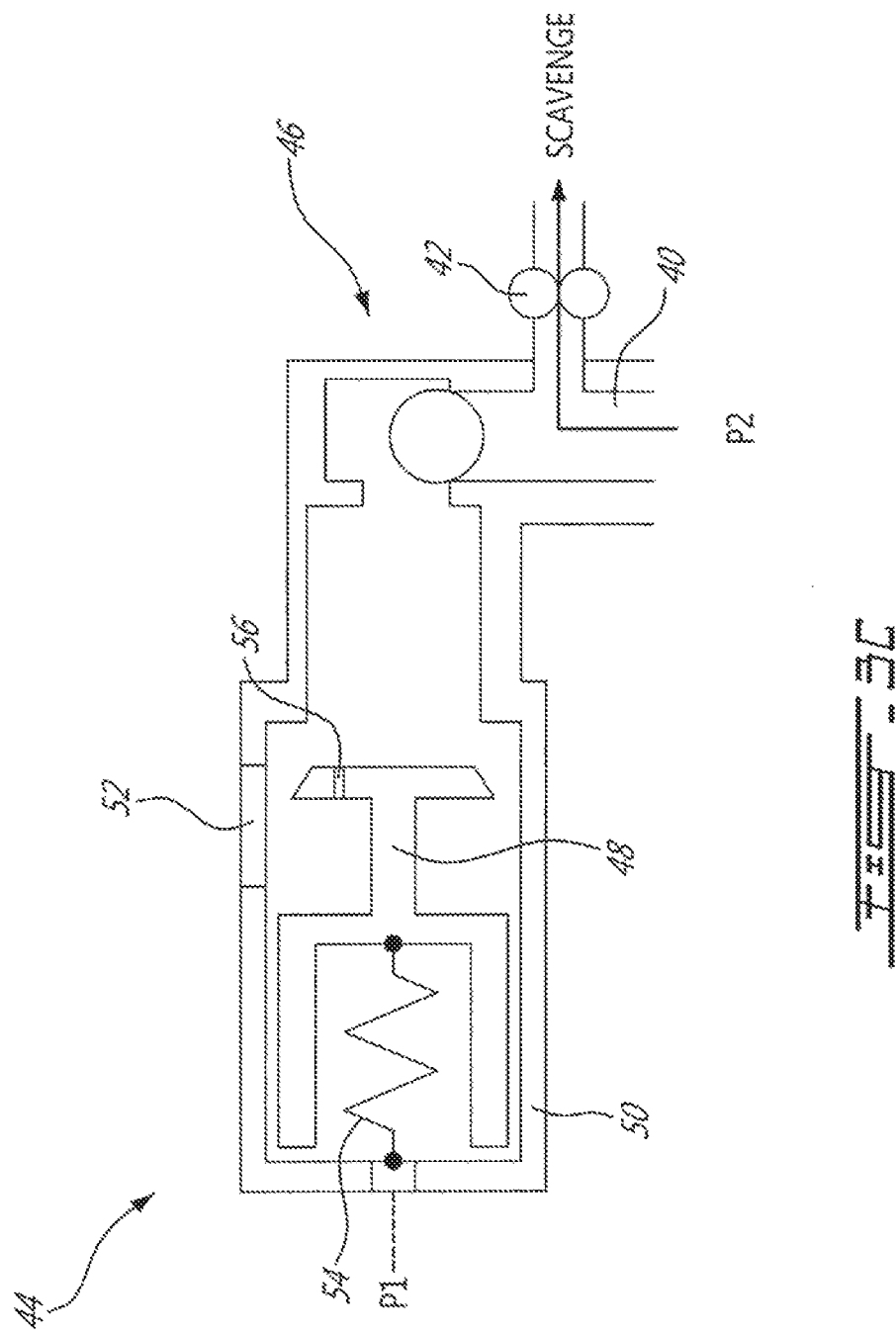

APPARATUS AND METHOD FOR CONTROLLING A PRESSURE DIFFERENTIAL ACROSS A SEAL OF A BEARING CHAMBER

TECHNICAL FIELD

The disclosure relates generally to gas turbine engines, and more particularly to seals of bearing chambers in gas turbine engine.

BACKGROUND

Gas turbine engines typically include one or more shafts supported by bearings. The bearings are housed in bearing chambers where oil is supplied to the bearings for lubrication and cooling. To prevent some of the oil from leaking out of such a bearing chamber, seals are provided between the bearing chamber and the shaft. Under normal operating conditions, the pressure outside of the bearing chamber is intentionally kept higher than the pressure inside of the bearing chamber so that there is a positive pressure differential across the seals. This positive pressure differential can prevent oil from exiting the bearing chamber via the seals. However, excessive wear or of failure of a seal could potentially cause oil leakage from the bearing chamber via the worn or failed seal.

SUMMARY

In one aspect, the disclosure describes an apparatus for controlling a pressure differential across one or more seals of a bearing chamber in a gas turbine engine. The apparatus comprises:

a scavenge pump in fluid communication with an interior of the bearing chamber for pumping oil from the bearing chamber; and a venting valve configured to controllably vent the interior of the bearing chamber in parallel to the scavenge pump based on the pressure differential across the one or more seals.

The venting valve may be configured to control venting of the interior of the bearing chamber based on a difference between a first pressure and a second pressure where the first pressure is indicative of a pressure of pressurized air supplied to an exterior of the one or more seals.

The second pressure may be a pressure at a position in fluid communication with the interior of the bearing chamber and between the one or more seals and the scavenge pump. The second pressure may be indicative of a pressure inside the bearing chamber.

The second pressure may be a pressure at a position upstream of the scavenge pump. The second pressure may be a pressure inside a scavenge line.

The venting valve may be configured to:

cause venting of the interior of the bearing chamber when the pressure differential is less than a predetermined non-zero threshold; and substantially stop venting the interior of the bearing chamber when the pressure differential is greater than the predetermined non-zero threshold.

The venting valve may comprise a biasing member urging the valve member toward an open position to cause venting of the interior of the bearing chamber. The biasing member may provide a biasing force correlated to the predetermined non-zero threshold.

The venting valve may comprise a valve member movable to a plurality of positions between a fully-open position and a fully-closed position in correlation with the pressure differential across the one or more seals. A first side of the valve member may be exposed to a pressure of pressurized air supplied to an exterior of the one or more seals. An opposite second side of the valve member may be exposed to a pressure at a position in fluid communication with the interior of the bearing chamber and between the one or more seals and the scavenge pump.

The venting valve may be configured to cause venting of the bearing chamber into an accessory gear box of the gas turbine engine.

The scavenge pump may be a fixed displacement pump having a capacity selected to maintain a desired pressure differential across the one or more seals when the one or more seals are in a normal non-failed condition.

The apparatus may comprise a non-return valve operatively disposed between the venting valve and the bearing chamber to prevent backflow through the venting valve.

Embodiments may include combinations of the above features.

In another aspect, the disclosure describes a method for controlling a pressure differential across one or more seals of a bearing chamber supplied with oil in a gas turbine engine. The method comprises:

pumping the oil from the bearing chamber to scavenge the oil supplied to the bearing chamber; and controllably venting the interior of the bearing chamber in parallel to pumping the oil, based on the pressure differential across the one or more seals.

The pressure differential may comprise a difference between a first pressure and a second pressure where the first pressure is indicative of a pressure of pressurized air supplied to an exterior of the one or more seals.

The second pressure may be a pressure at a position in fluid communication with the interior of the bearing chamber and between the one or more seals and a scavenge pump driving the oil.

The method may comprise: venting the interior of the bearing chamber when the pressure differential is less than a predetermined non-zero threshold; and substantially stopping to vent the interior of the bearing chamber when the pressure differential is greater than the predetermined non-zero threshold.

The method may comprise venting the bearing chamber into an accessory gear box of the gas turbine engine.

The method may comprise preventing backflow through a venting valve configured to cause the venting.

Embodiments may include combinations of the above features.

In another aspect, the disclosure describes a method for controlling a pressure differential across one or more seals of a bearing chamber supplied with oil in a gas turbine engine. The method comprises:

pumping the oil from the bearing chamber to scavenge the oil supplied to the bearing chamber; and controllably venting the interior of the bearing chamber in parallel to pumping the oil based on the pressure differential across the one or more seals, the pressure differential comprising a difference between a first pressure and a second pressure where the first pressure is indicative of a pressure of pressurized air supplied to an exterior of the one or more seals and the second pressure is indicative of a pressure inside the bearing chamber.

The method may comprise:

venting the interior of the bearing chamber when the pressure differential is less than a predetermined non-zero threshold; and substantially stopping to vent the interior of the bearing chamber when the pressure differential is greater than the predetermined non-zero threshold.

The method may comprise venting the bearing chamber into an accessory gear box of the gas turbine engine.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIGS. 3A-3C are schematic representations of an exemplary venting valve of the apparatus of FIG. 2 configured for different operating conditions.

DETAILED DESCRIPTION

The following disclosure relates to apparatus and methods for controlling a pressure differential across one or more seals of a bearing chamber of a gas turbine engine to reduce or prevent oil loss in the event of excessive wear or failure of such seal(s). In various embodiments, the apparatus described herein comprise a scavenge pump for pumping oil away from the bearing chamber and a venting valve configured to vent the interior of the bearing chamber in parallel to the scavenge pump. In some embodiments, the scavenge pump is sized to have pumping capacity selected to maintain a desired pressure differential across the one or more seals when the one or more seals are in a normal non-failed condition. In the event of excessive wear or failure of the seal(s) causing a reduction of a positive pressure differential across the seal(s), the venting valve is caused to open to supplement the evacuation of the bearing chamber provided by the scavenge pump to promote the flow of air supplied to the seal(s) into the bearing chamber and thereby reduce or prevent oil from leaking out of the bearing chamber via the compromised seal(s).

Aspects of various embodiments are described through reference to the drawings.

Figure 1:
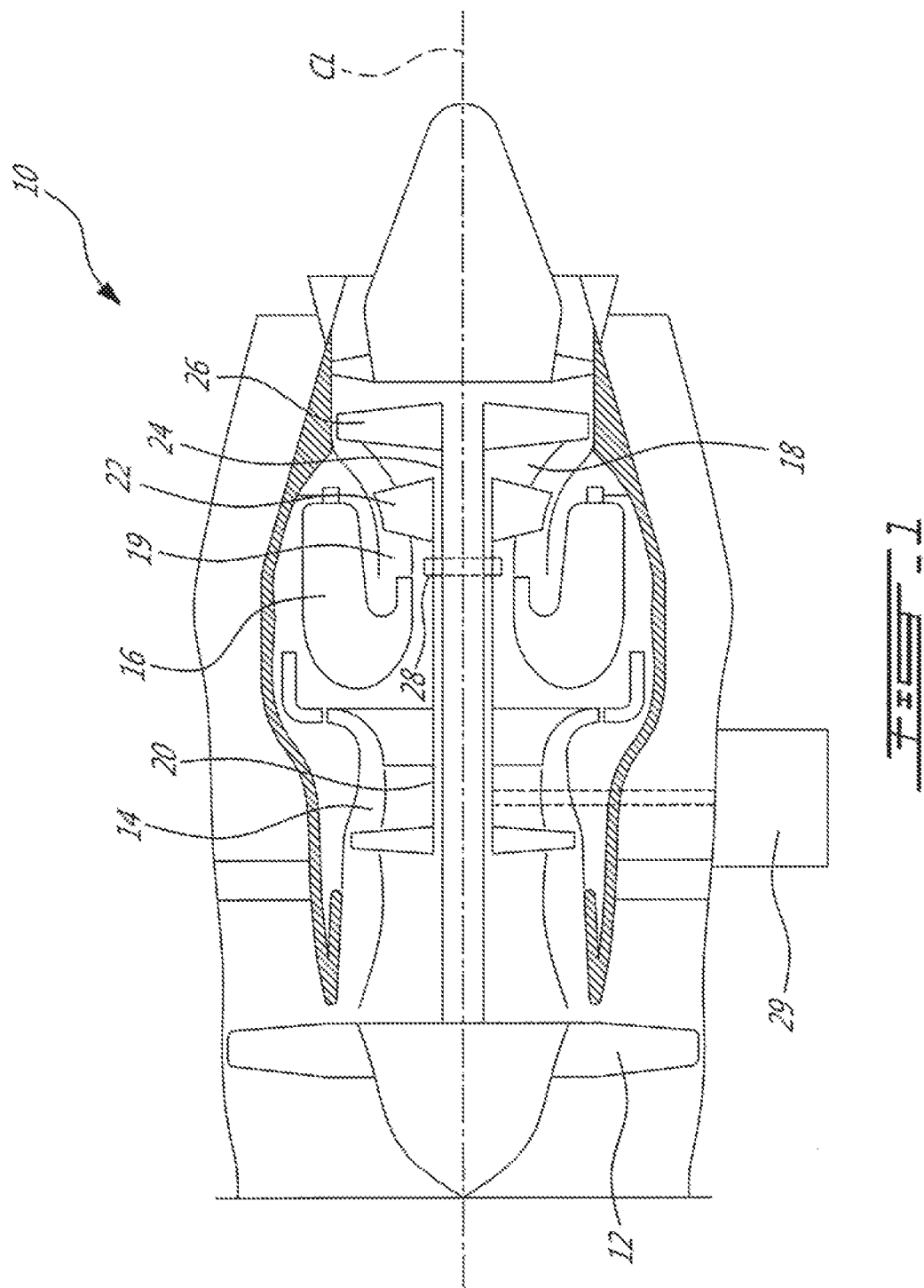
FIG. 1 is a schematic axial cross-section view of an exemplary gas turbine engine.

FIG. 1 is a schematic axial cross-section view of an exemplary gas turbine engine 10. Gas turbine engine 10 may be of a type preferably provided for use in subsonic flight generally comprising, in serial flow communication, fan 12 through which ambient air is propelled, multistage compressor 14 for pressurizing the air, combustor 16 in which the compressed air is mixed with fuel and ignited for generating an annular stream of hot combustion gases, and turbine section 18 for extracting energy from the combustion gases. In some embodiments, gas turbine engine 10 may be suitable for mounting to and propelling an (e.g., fixed-wing or rotary wing) aircraft. Alternatively, gas turbine engine 10 may be configured as an auxiliary power unit (APU) for use on an aircraft, or, gas turbine engine 10 may be used for a ground-based industrial application such as power generation.

In various embodiments, gas turbine engine 10 may have a dual-spool configuration but it is understood that gas turbine engine 10 may not be limited to such configuration. For example, gas turbine engine 10 may comprise high-pressure spool 20 including one or more stages of multistage compressor 14 and one or more high-pressure turbines 22 of turbine section 18. Gas turbine engine 10 may also comprise low-pressure spool 24 including one or more stages of multistage compressor 14 and one or more low-pressure (i.e. power) turbines 26 of turbine 18. Low-pressure spool 24 may be drivingly coupled to fan 12. Gas turbine engine 10 may comprise one or more bearings 28 (only one being shown) suitable for rotatably supporting a shaft (e.g., of high-pressure spool 20 or of low-pressure spool 24) for rotation about rotational axis CL or some other axis. In some embodiments, bearings 28 may be roller bearings. Gas turbine engine 10 may comprise accessory gearbox (AGB) 29 sometimes also referred to as "accessory drive" which may drive one or more accessories connected thereto such as fuel pump(s), oil pump(s) and/or electrical generator(s) for example.

Figure 2:
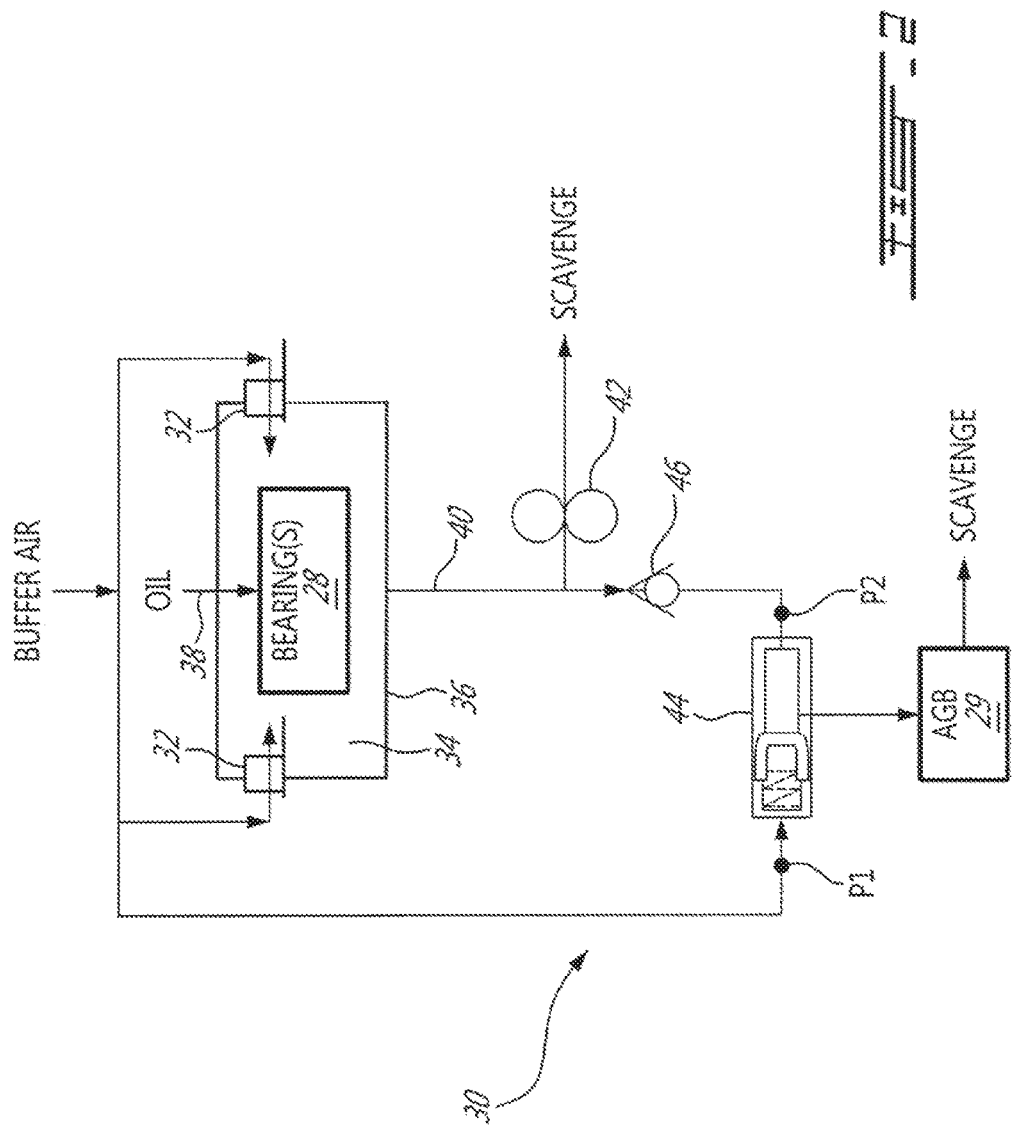
FIG. 2 is a schematic representation of an exemplary apparatus for controlling a pressure differential across one or more seals of a bearing chamber in the gas turbine engine of FIG. 1.

FIG. 2 is a schematic representation of an apparatus 30 for controlling a pressure differential ΔP (e.g., P1-P2) across one or more seals 32 of bearing chamber 34 in gas turbine engine 10. FIG. 2 also shows an axial cross-sectional view of bearing chamber 34 inside which bearing(s) 28 may be housed. Accordingly, bearing chamber 34 may be at least partially defined by housing 36. Bearing chamber 34 may contain bearing(s) 28 and optionally one or more other devices requiring lubrication (i.e., lubrication load(s)). Bearing chamber 34 may be connected to or considered part of an oil distribution and scavenging system of gas turbine engine 10 where oil from an oil tank (not shown) may be delivered to bearing chamber 34 via oil delivery line 38, and, used oil may be returned from bearing chamber 34 to the oil tank via oil scavenging line 40. A suitable scavenge pump 42 may be configured to drive (i.e., pump) the oil from bearing chamber 34 via scavenge line 40 and toward the oil tank.

Housing 36 defining bearing chamber 34 may be secured to suitable structure (e.g., casing) of gas turbine engine 10. Seal(s) 32 may be disposed to provide sealing between housing 36 and a shaft of gas turbine engine 10 to hinder the leakage of oil via seal(s) 32. In various embodiments, seal(s) 32 may be of a type known as "low air flow" seal configured to permit a flow of air thereacross when a pressure differential exists across seal(s) 32. In various embodiments, seal(s) 32 may, for example, comprise one or more radial contact seals, one or more axial face seals, one or more lift-off seals, one or more contacting carbon seals, one or more labyrinth seals, one or more elastomeric seals, one or more air-riding carbon seals or one or more lip seals. In some embodiments, seal(s) 32 may comprise a combination of two or more of the foregoing types of seals, or other types of seal(s).

The exterior of seal(s) 32 may be supplied with pressurized buffer air so that a positive pressure differential ΔP exists across seal(s) 32 so that the buffer air may enter bearing chamber 34 instead of oil leaking out of bearing chamber 34. The pressurized buffer air may be a single source of pressurized air supplied on one or more seals 32. The pressurized buffer air may be supplied by a stage of compressor 14. In some embodiments, pressurized air extracted from compressor 14 may be conditioned (e.g., cooled and/or pressure-regulated) prior to being supplied as buffer air to seal(s) 32. For example, in some embodiments, the gage pressure of the buffer air may be about 80 psi or less. The pressure of the buffer air may be selected so that a positive pressure differential ΔP is obtained across seal(s) 32 during at least some phases of operation of gas turbine engine 10. The positive pressure differential ΔP may be defined by a first pressure P1 at the exterior of seal(s) 32 being greater than a second pressure P2 at the interior of seal(s) 32 so that buffer air may enter bearing chamber 34 vial seal(s) 32 instead of oil leaking out of bearing chamber 34 vial seal(s) 32. In some embodiments, the pressure differential ΔP may be determined using a pressure P1 of the buffer air upstream of seal(s) 32 and a pressure P2 downstream of seal(s) 32 where ΔP=P1−P2. In some embodiments, the second pressure P2 may be a pressure inside of bearing chamber 34. In some embodiments, the second pressure P2 may be a pressure inside of scavenge line 40. In some embodiments, the second pressure P2 may be a pressure at a position in fluid communication with the interior of bearing chamber 34. In some embodiments, the second pressure P2 may be a pressure at a position between seal(s) 32 and scavenge pump 42. In some embodiments, the pressure inside of scavenge line 40 may be sufficiently close to the pressure inside of bearing chamber 34 and may be suitable for the determination of ΔP for the purpose of controlling venting of bearing chamber 34 as explained below.

Apparatus 30 may be used to control pressure differential ΔP across seal(s) 32 of bearing chamber 34 of gas turbine engine 10. In some embodiments, apparatus 30 may substantially prevent or hinder the leakage of oil out of bearing chamber 34 via seal(s) 32 during normal operation (i.e., when seal(s) 32 is/are in a normal, non-failed condition). In some embodiments, apparatus 30 may substantially prevent or hinder the leakage of oil out of bearing chamber 34 via seal(s) 32 during a condition of excessive wear of seal(s) 32, during a failure condition of seal(s) 32 or other condition where seal(s) 32 may be compromised. In the event of excessive wear or failure, a larger opening area may be present between housing 36 and the shaft and therefore seal(s) 32 may offer less resistance to the flow of buffer air into bearing chamber 34. Consequently, the pressure differential ΔP across seal(s) 32 could, without apparatus 30, be reduced and possibly even reversed where P1<P2 for example and thereby increase the likelihood of oil leaking out of bearing chamber 34. The use of apparatus 30 may, in some embodiments and to some extent, control the pressure differential ΔP across seal(s) 32 in order to prevent or hinder such reduction or reversal of the pressure differential ΔP that could otherwise occur during excessive wear or failure of seal(s) 32.

In some embodiments, apparatus 30 may comprise scavenge pump 42 in fluid communication with an interior of bearing chamber 34 for driving oil to be scavenged from bearing chamber 34 toward an oil tank, and venting valve 44 configured to controllably vent of the interior of bearing chamber 34 in parallel to scavenge pump 42. In some embodiments, the operation of venting valve 44 may be controlled based on pressure differential ΔP across seal(s) 32.

In some embodiments, venting valve 44 may allow for a preferred (e.g., optimum) sealing pressure differential ΔP to be maintained across seal(s) 32 during normal operating conditions and, in case of excessive wear or failure of seal(s) 32, may also prevent a sudden loss of oil and in-flight shutdown due to low engine oil pressure. In some embodiments, venting valve 44 may comprise a variable-flow blowdown valve or other suitable type of valve. Scavenge pump 42 may be a suitable fixed-displacement pump having a normal operating capacity selected to maintain a desired (e.g., optimum) pressure differential ΔP across seal(s) when seal(s) 32 are in a normal non-failed condition and oil is supplied to bearing chamber 34. For the sake of better seal durability, it can be advantageous to maintain a desired pressure differential ΔP across seal(s) 32 by the appropriate selection of the capacity of scavenge pump 42 in view of the expected flow of buffer air and of oil into bearing chamber 34 when seal(s) 32 are in a normal non-failed condition. In order to avoid the use of an over-designed scavenge pump 42, which may be larger and heavier than necessary, scavenge pump 42 may be selected not to have the additional capacity required to sufficiently evacuate bearing chamber 34 in the event of excessive wear or failure of seal(s) 32. For example, the normal operating capacity of scavenge pump 42 may be at or relatively close to its maximum capacity and may leave little margin for compensating for excessive wear or failure of seal(s) 32. Instead, in the event of excessive wear or failure of seal(s) 32 causing a reduction of a positive pressure differential ΔP across seal(s) 32, venting valve 44 may be caused to open to supplement the evacuation of bearing chamber 34 by scavenge pump 42 and promote the flow of buffer air supplied to seal(s) 32 into bearing chamber 34 and out through venting valve 44 to reduce or prevent oil from leaking out of bearing chamber 34 via seal(s) 32. In some embodiments, scavenge pump 42 may be the single, one and only pump used to drive oil out of bearing chamber 34 under any modes of operation.

In some embodiments, venting valve 44 may be configured to control venting of the interior of bearing chamber 34 based on a difference between first pressure P1 and second pressure P2. As explained above, first pressure P1 may be indicative of a pressure of the pressurized buffer air supplied to an exterior of seal(s) 32. Second pressure P2 may be a pressure at a position upstream of the scavenge pump (e.g., inside bearing chamber 34 or inside scavenge line 40). In various embodiments, pressures P1 and P2 may be pressures at any suitable respective locations providing an indication of pressure differential ΔP across seal(s) 32. In various embodiments, pressures P1 and P2 may be pressures at any suitable respective locations allowing pressure differential ΔP across seal(s) 32 to be derived.

In various embodiments, venting valve 44 may configured to cause venting of bearing chamber 34 to the atmosphere (e.g., out of engine 10) or to another portion of gas turbine engine 10 that may be supplied with oil and that may be connected to the oil scavenging system of gas turbine engine 10. For example, venting valve 44 may cause venting of bearing chamber 34 to another portion of gas turbine engine 10 that is at a lower pressure than bearing chamber 34 and that may also be supplied with oil. For example, in some embodiments, venting valve 44 may cause venting of bearing chamber 34 into another bearing chamber or into a gearbox such as AGB 29 of gas turbine engine 10. The venting of bearing chamber 34 into AGB 29 or into another suitable portion of gas turbine engine 10 may permit oil that is vented together with air via venting valve 44 to also be scavenged by way of a scavenge line that may be associated with the other portion or AGB 29 for example.

In some embodiments, apparatus 30 may comprise a non-return valve 46 operatively disposed between venting valve 44 and bearing chamber 34 to prevent backflow through venting valve 44 in some mode(s) of operation of gas turbine engine 10. Non-return valve 46 may be operatively disposed between venting valve 44 and scavenge pump 42. Non-return valve 46 may be disposed upstream of venting valve 44. In some embodiments, non-return valve 46 may be a ball check valve.

FIG. 3A is a schematic representation of venting valve 44 and non-return valve 46 of apparatus 30 where venting valve 44 is closed. In some embodiments, venting valve 44 may comprise movable valve member 48 where the position of valve member 48 is automatically controlled based on the pressure differential $\Delta P$ between two fluids acting directly on opposite sides of valve member 48. Alternatively, it is understood that similar function could also be achieved using a servo-controlled valve member controlled as a function of the pressure differential $\Delta P$ determined based on sensed values of P1 and P2. The configuration of venting valve 44 shown in FIG. 3A may correspond to a normal operating condition of gas turbine engine 10 where venting of bearing chamber 34 in parallel to scavenge pump 42 may not be required. The situation represented in FIG. 3A may be one where seal(s) 32 are in a normal non-failed condition and where at least a majority of the buffer air and oil supplied to bearing chamber 34 is evacuated from bearing chamber 34 via scavenge pump 42.

Movable valve member 48 may be housed inside valve body 50 and be translatable. In the fully-closed position as shown in FIG. 3A, valve member 48 may substantially prevent venting of bearing chamber 34 via venting port 52 formed in valve body 50. In some embodiments, venting valve 44 and non-return valve 46 may share a common valve body 50 as illustrated herein.

Valve member 48 may be movable to a plurality of positions between a fully-open position and a fully-closed and the position of valve member 48 may be correlated to pressure differential $\Delta P$ across seal(s) 32. Regulating the position of valve member 48 as a function of pressure differential $\Delta P$ to control venting of bearing chamber 34 may in turn actively control pressure differential $\Delta P$ across seal(s) 32.

A first side (e.g., left side in FIG. 3A) of valve member 48 may be exposed to first pressure P1 and a second (opposite) side (e.g., right side in FIG. 3A) may be exposed to second pressure P2. For example the first side of valve member 48 may be in fluid communication with the pressurized buffer air and the second side of valve member 48 may be in fluid communication with bearing chamber 34 via scavenge line 40 and non-return valve 46. Accordingly, pressures P1 and P2 may act on opposite sides of valve member 48, which may be configured as a piston. First pressure P1 may urge valve member 48 toward its fully closed position to substantially stop venting of the interior of bearing chamber 34. Second pressure P2 may urge valve member 48 toward its fully open position.

In some embodiments, venting valve 44 may comprise biasing member 54 (e.g., spring) urging valve member 48. Biasing member 54 may provide a biasing force that preloads valve member 48 toward its fully-open position. For example, valve member 48 may be spring-loaded. The biasing force may be selected to correlate to a predetermined non-zero threshold in pressure differential $\Delta P$ so that; venting of the interior of bearing chamber 34 is permitted only when the pressure differential $\Delta P$ is less than the predetermined non-zero threshold; and, that venting of the interior of bearing chamber 34 is stopped when the pressure differential $\Delta P$ is greater than the predetermined non-zero threshold. In some embodiments, biasing member 54 may be configured to provide a biasing force that corresponds to a predetermined non-zero threshold of about 10 psi for pressure differential $\Delta P$. In the configuration shown in FIG. 3A, biasing member 54 may urge valve member 48 toward its fully-open position so that if the value of first pressure P1 is greater than second pressure P2 by more than about 10 psi, valve member 48 will remain closed. In other words, a positive pressure differential $\Delta P$ greater than about 10 psi is required to overcome the biasing force provided by biasing member 54 and keep valve member 48 in its fully-closed position to substantially prevent venting of bearing chamber 34 via venting port 52. It is understood that values other than 10 psi may be suitable as non-zero thresholds in different applications. For example, the value of the non-zero threshold may be selected to be a pressure differential below which there would be a risk of oil leakage via seal(s) 32. FIG. 3A shows an exemplary configuration of venting valve 44 where biasing member 54 is extended when valve member 48 is in its fully-closed position but it is understood that venting valve 44 could alternatively be configured so that biasing member 54 is compressed when valve member 48 is in its fully-closed position.

Valve member 48 may also include a tuning orifice 56 formed therein to allows for a small amount of fluid flow through valve member 48 from oil scavenging line 40 (i.e., at pressure P2) to venting port 52 even when valve member 48 is in its fully-closed position. The relatively small and sometimes constant flow through tuning orifice 56 may assist in maintaining non-return valve 46 in an open position during normal engine operation. Accordingly, when valve member 48 in its fully-closed position the venting of bearing chamber 34 via venting port 52 may be substantially prevented (e.g., except for the relatively small flow that may pass through tuning orifice 56). Tuning orifice 56 may also be considered in conjunction with biasing member 54 for defining a suitable predetermined non-zero pressure threshold for causing valve member 48 to open.

FIG. 3B is a schematic representation of venting valve 44 of apparatus 30 where venting valve 44 is open and non-return valve 46 is also open. In the configuration shown in FIG. 3B, biasing member 54 may cooperate with second pressure P2 in urging valve member 48 toward its fully-open position so that if the pressure differential $\Delta P$ becomes less than the selected non-zero threshold, the biasing force provided by biasing member 54 will cause valve member 48 to move toward its fully-open position and cause venting of bearing chamber 34 via venting port 52. The configuration of venting valve 44 shown in FIG. 3B may correspond to a condition of excessive wear or failure of seal(s) 32 where venting of bearing chamber 34 in parallel to scavenge pump 42 may be required due to the reduction in flow resistance offered by seal(s) 32 in order to accommodate more buffer air into bearing chamber 34. The opening of venting valve 44 may provide a secondary flow path for venting bearing chamber 34 where the secondary flow path is parallel to a primary scavenging flow path associated with scavenge pump 42. The secondary flow path may increase the capacity for buffer air to flow into bearing chamber 34 and may consequently cause an increase in pressure differential $\Delta P$ in order to prevent oil leakage via one or more compromised seal(s) 32.

FIG. 3C is a schematic representation of venting valve 44 of apparatus 30 where venting valve 44 is open and non-return valve 46 is closed to prevent backflow through venting valve 44. The configuration of venting valve 44 shown in FIG. 3C may correspond to an engine start or other condition where pressure differential $\Delta P$ is such that venting valve 44 is caused to open but that venting via venting valve 44 is not required or desired. During engine start for example, scavenge pressure P2 may be lower than a pressure downstream of venting valve 44 (e.g., a pressure in AGB 29) and it may be desirable that scavenge pump 42 not draw fluid through venting valve 44. Accordingly, the closing of non-return valve 46 may prevent backflow through venting valve 44 that could otherwise be induced by scavenge pump 42. The closing of non-return valve 46 ensures that scavenge pump 42 will only draw from the upstream bearing chamber 34 instead of through venting valve 44 (e.g., from AGB 29).

Figure 4:
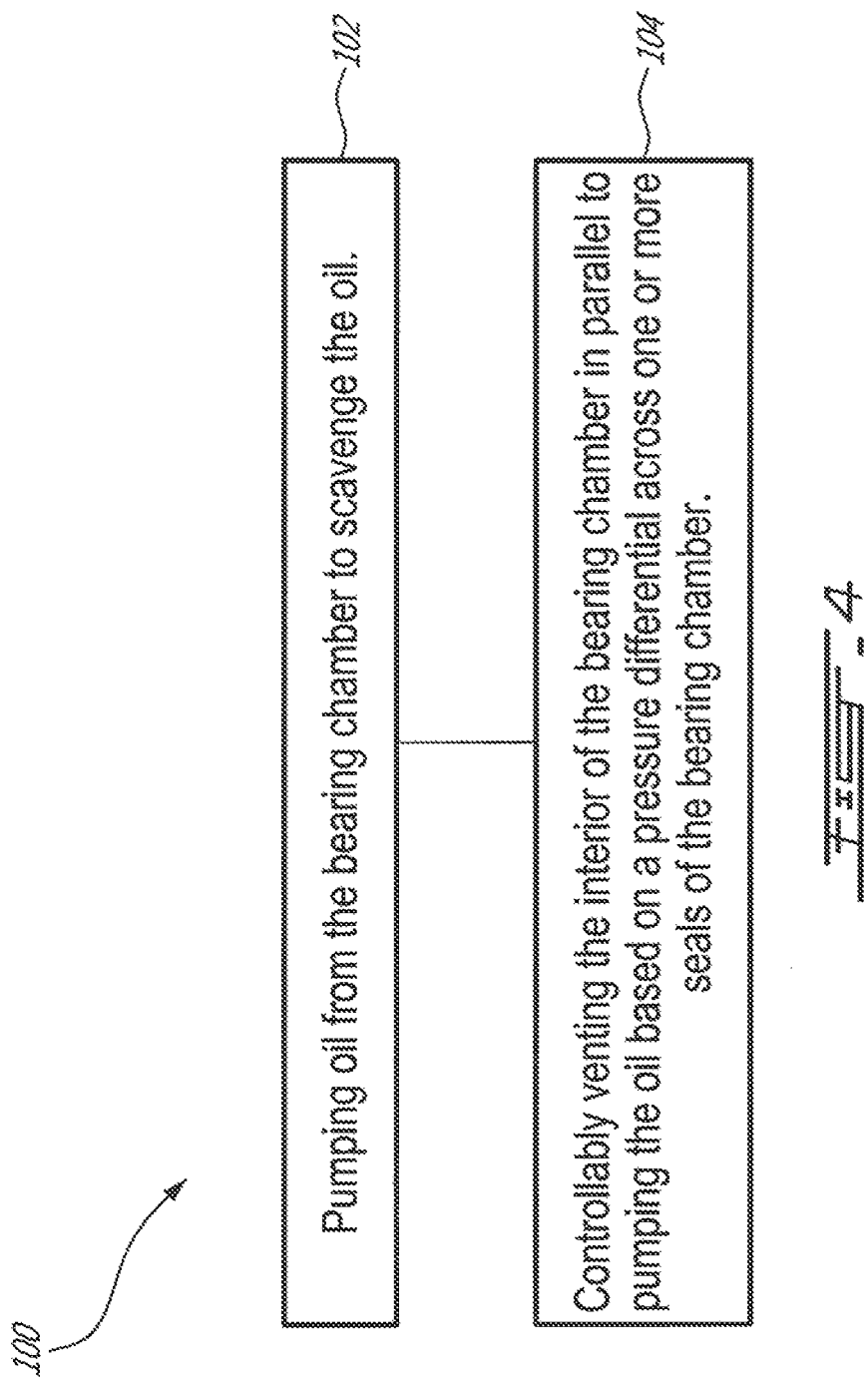
FIG. 4 is a flow diagram of an exemplary method for controlling a pressure differential across one or more seals of a bearing chamber supplied with oil in the gas turbine engine of FIG. 1.

FIG. 4 is a flow diagram of method 100 for actively controlling a pressure differential $\Delta P$ across seal(s) 32 of bearing chamber 34 supplied with oil in gas turbine engine 10. Method 100 may be performed using apparatus 30 described herein or may be performed using another suitable type of apparatus. In various embodiments, method 100 may comprise: pumping oil from bearing chamber 34 to scavenge the oil (see block 102); and controllably venting the interior of bearing chamber 34 in parallel to pumping the oil, based on pressure differential $\Delta P$ across seal(s) 32 (see block 104).

In some embodiments, the pressure differential may comprise a difference between first pressure P1 and second pressure P2 where first pressure P1 is indicative of a pressure of a source of air (e.g., pressurized buffer air) supplied to an exterior of seal(s) 32. Second pressure P2 may be a pressure at a position in fluid communication with the interior of bearing chamber 34 and between seal(s) 32 and scavenge pump 32 driving the oil. Second pressure P2 may be indicative of a pressure inside bearing chamber 34.

In some embodiments, method 100 may comprise venting the interior of bearing chamber 34 when pressure differential $\Delta P$ is less than a predetermined non-zero threshold. Method 100 may also comprise substantially stopping to vent the interior of bearing chamber 34 when pressure differential $\Delta P$ is greater than the predetermined non-zero threshold.

In various embodiments, method 100 may comprise venting bearing chamber 34 into AGB 29 or to the atmosphere.

In some embodiments, method 100 may comprise preventing backflow through venting valve 44 causing the venting by way of non-return valve 46 for example.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. An apparatus for controlling a pressure differential across one or more seals of a bearing chamber in a gas turbine engine, the apparatus comprising:

a scavenge pump in fluid communication with an interior of the bearing chamber for pumping oil from the bearing chamber; and a venting valve configured to controllably vent the interior of the bearing chamber in parallel to the scavenge pump based on the pressure differential across the one or more seals, wherein:

the venting valve is configured to: cause venting of the interior of the bearing chamber when the pressure differential is less than a predetermined non-zero threshold; and substantially stop venting the interior of the bearing chamber when the pressure differential is greater than the predetermined non-zero threshold; and the venting valve comprises a biasing member urging a valve member toward an open position to cause venting of the interior of the bearing chamber, the biasing member providing a biasing force correlated to the predetermined non-zero threshold.

2. The apparatus as defined in claim 1, wherein the venting valve is configured to control venting of the interior of the bearing chamber based on a difference between a first pressure and a second pressure where the first pressure is indicative of a pressure of pressurized air supplied to an exterior of the one or more seals.

3. The apparatus as defined in claim 2, wherein the second pressure is a pressure at a position in fluid communication with the interior of the bearing chamber and between the one or more seals and the scavenge pump.

4. The apparatus as defined in claim 2, wherein the second pressure is a pressure at a position upstream of the scavenge pump.

5. The apparatus as defined in claim 2, wherein the second pressure is a pressure inside a scavenge line.

6. The apparatus as defined in claim 1, wherein:

the valve member is movable to a plurality of positions between a fully-open position and a fully-closed position in correlation with the pressure differential across the one or more seals;

a first side of the valve member is exposed to a first pressure indicative of a pressure of pressurized air supplied to an exterior of the one or more seals; and an opposite second side of the valve member is exposed to a second pressure, the second pressure being a pressure at a position in fluid communication with the interior of the bearing chamber and between the one or more seals and the scavenge pump.

7. The apparatus as defined in claim 1, wherein the venting valve is configured to cause venting of the bearing chamber into an accessory gear box of the gas turbine engine.

8. The apparatus as defined in claim 1, wherein the scavenge pump is a fixed displacement pump having a capacity selected to maintain a desired pressure differential across the one or more seals when the one or more seals are in a normal non-failed condition.

9. The apparatus as defined in claim 1, comprising a non-return valve operatively disposed between the venting valve and the bearing chamber to prevent backflow through the venting valve.

* * * * *